March 16, 1954
T. V. JONES
2,672,171
TRACTOR-MOUNTED BRUSH SAW
Filed May 23, 1952
2 Sheets-Sheet 1
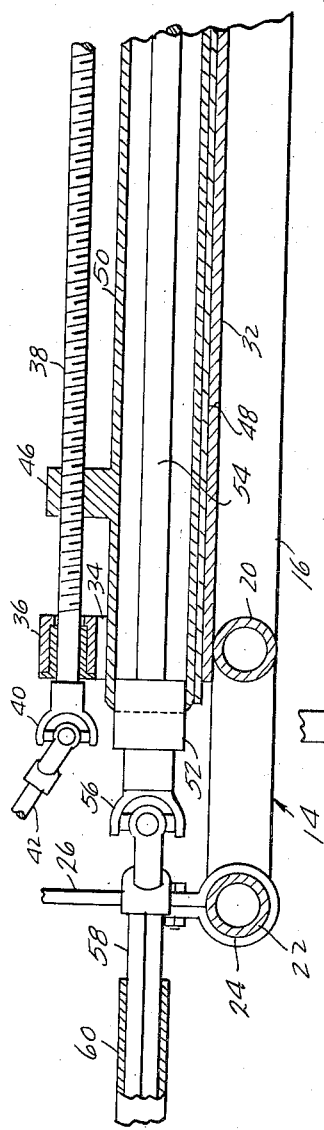
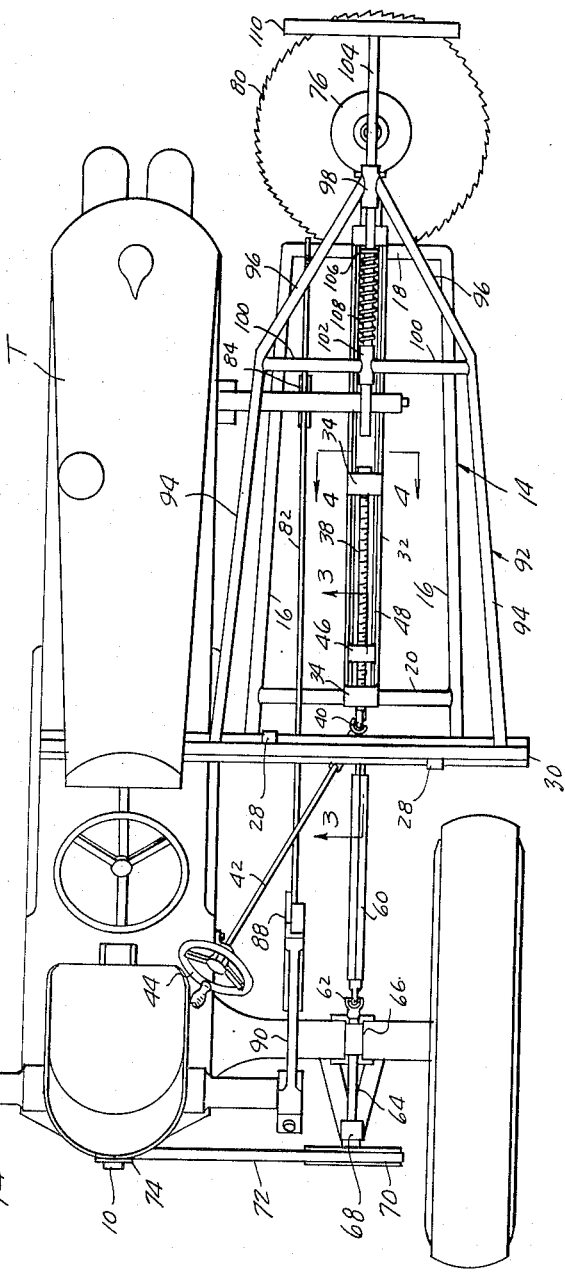
INVENTOR.
T. V. JONES,
BY
McMorrow, Berman & Davidson
ATTORNEYS.

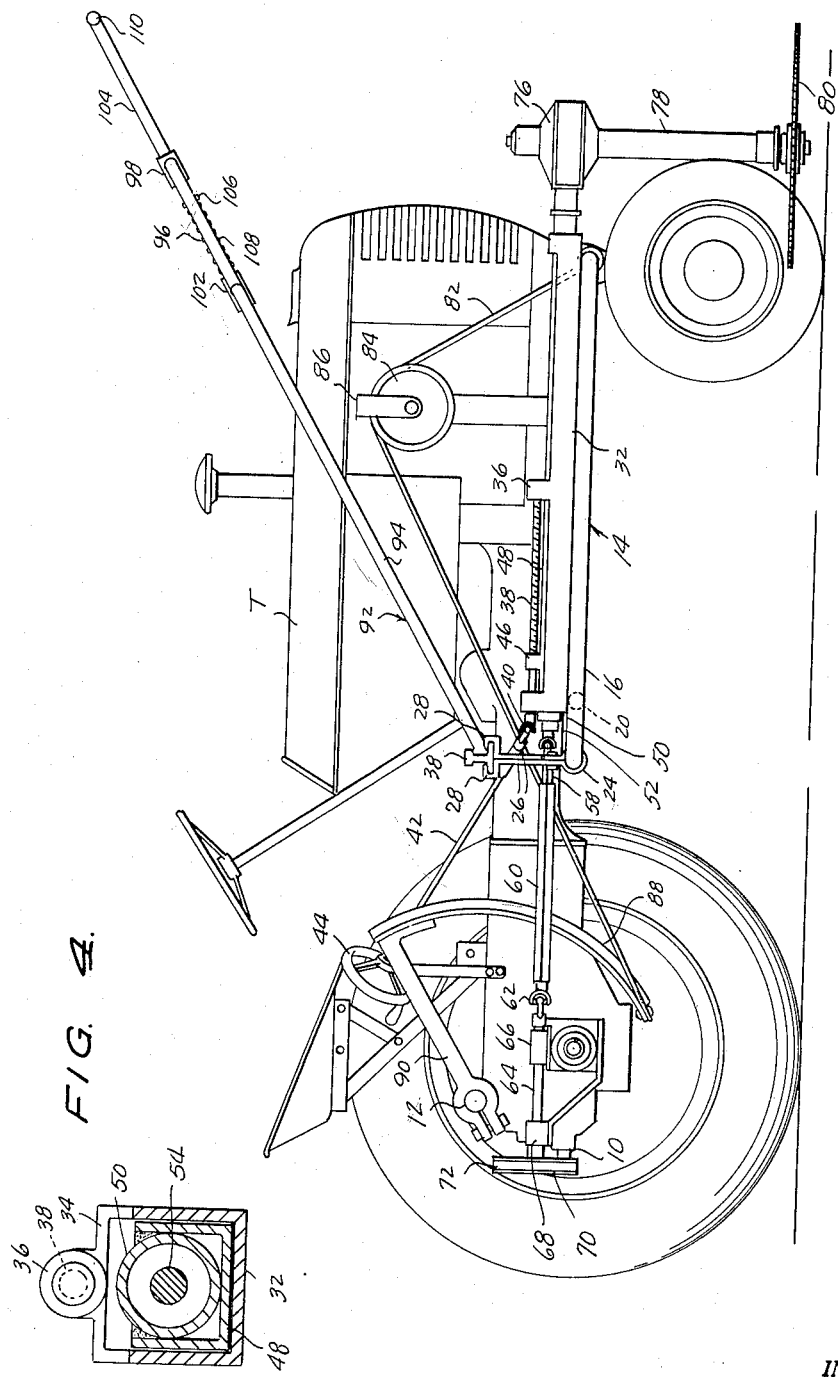

Patented Mar. 16, 1954

2,672,171

UNITED STATES PATENT OFFICE 2,672,171

TRACTOR-MOUNTED BRUSH SAW

T. V. Jones, Logansport, La.

Application May 23, 1952, Serial No. 289,575

2 Claims. (Cl. 143—43)

This invention relates to tractor attachments. More particularly, the invention has reference to a saw for cutting brush, trees, and the like, that is adapted to be mounted upon a conventional tractor, and readily coupled to the power take-off of said tractor.

Most saws of the general type referred to that are now in use are, to my knowledge, connected to the tractor with a rigid connection. As a result, when the saw is placed against the tree to be cut, the tractor must continue its forward movement as the saw cuts into the tree, for the purpose of holding the cutting edge of the saw at the base of the kerf made in the tree.

Additionally, saws of the type stated are, to the best of my knowledge, usually driven by motors that are separate from the tractor motor.

In view of the above, it is proposed, by the present invention, to provide a saw attachment of the type stated that can be manufactured and sold separately from the tractor, thus to permit the attachment to be mounted upon a tractor only at such times as it is actually to be used. In this way, regular use can be made of the tractor, with the saw being mounted upon the machine only when trees or brush are to be cut.

It is also an important object of the invention to provide a saw attachment as described that will be belt driven from the power take-off of the tractor, and readily adjusted for height by the hydraulic power lift arm provided as a conventional tractor component.

Yet another object of the invention is to provide an attachment as stated which will permit the tractor to remain stationary during the operation of felling a tree or the like.

Another important object is to provide, on an attachment of the character referred to, a boom or pressure arm adapted to exert pressure against the trunk of the tree at a location spaced above that at which the tree is being sawed, said arm being novelly designed in a manner to exert a yieldable but continuous pressure against the tree trunk, with said pressure being, in effect, increased when the tree is cut through, thus to force the tree in a direction away from the tractor during its falling movement.

Another object of importance is to provide an attachment as stated that can be manufactured at relatively low cost, but will yet be rugged and capable of use over a long period of time.

Other objects will appear from the following description, the claims appended thereto, and from the annexed drawings, in which like reference characters designate like parts throughout the several views, and wherein:

Figure 1 is a top plan view of an attachment formed in accordance with the present invention, a tractor on which the attachment is mounted being illustrated fragmentarily;

Figure 2 is a side elevational view;

Figure 3 (Sheet 1) is an enlarged sectional view on line 3—3 of Figure 1; and

Figure 4 (Sheet 2) is an enlarged sectional view on line 4—4 of Figure 1.

Referring to the drawings in detail, a conventional tractor has been designated by the reference letter T, said tractor having a conventional power take-off shaft 10 and a hydraulically operated power lift shaft 12.

A main frame has been designated generally by the reference numeral 14, and can be of tubular formation throughout, for the purpose of imparting strength and rigidity thereto. In the illustrated embodiment of the invention, the main frame includes a pair of spaced side rails 16, integral at their front ends with a front end rail 18 extending transversely therebetween. Adjacent their rear ends, the side rails 16 are rigid with the opposite ends of a cross brace 20, said side rails 16 being rigidly secured at their rear ends to a transversely disposed rear end rail 22 (Figure 3).

The main frame 14 is pivotally mounted to swing upwardly and downwardly about a horizontal axis defined by the rear end rail 22. To provide for the desired pivotal mounting of the main frame, I provide spaced hinge sleeves 24, in which the rear end rail 22 is rotatably mounted, said sleeves being respectively disposed adjacent the opposite ends of said rear end rail.

The respective hinge sleeves 24 are integral with vertically disposed hanger arms 26 formed at their upper ends with flanges 28 embracing the opposite sides of an elongated support bar 30. The support bar is rigidly secured to the tractor frame in any suitable manner, and projects laterally beyond one side of the tractor, as best shown in Figure 1.

Affixed to the cross brace 20 and front end rail 18, and extending longitudinally and centrally of the main frame, is a channeled support plate 32, said plate extending substantially for the full length of the main frame, as best shown in Figure 2.

At the rear end of the support plate 32, and at a location intermediate the opposite ends of said plate, I provide cross pieces 34 upon said plate, said cross pieces being fixedly connected to the plate and being respectively formed (Figure 4) with bearings 36.

Journaled in the bearings 36 are the smoothsurfaced opposite ends of an advancing screw 38 which, as shown in Figure 3, is connected at its rear end by a universal joint 40 to a rotatable operating rod 42, that is rotated from the driver's seat of the tractor by means of a hand wheel 44 (Figures 1 and 2).

Threadedly engaged with the screw 38 is a follower 46. Thus, on rotation of the screw, the follower will be advanced or retracted, depending upon the direction of screw rotation.

A channeled housing 48 is seated within and is slidable longitudinally of the support plate 32, and engaged within said housing is a tubular shaft housing 50 through which extends a shaft 54. The shaft housing 50 can be welded or otherwise fixedly secured within the channeled housing 48, and is also welded or otherwise rigid with the follower 46. Thus, on movement of the follower 46 longitudinally of the main frame 14, the shaft housing 50 and the channeled housing 48 will move therewith.

At its rear end, the shaft 54 is journaled in a bearing 52 (Figure 3) secured within the shaft housing 50, and it will be understood that any number of bearings 52 can be provided, spaced longitudinally of the shaft housing 50 as desired.

The shaft 54 projects beyond the rear end of the shaft housing, and is connected by a universal joint 56 to a telescopic shaft 58, said shaft being slidably mounted within and rotated with a hollow shaft 60. The shaft 60 is connected, at its rear end, by means of a universal joint 62, to shaft 64 journaled in bearings 66, 68 respectively, said bearings being respectively mounted on the rear axle housing of the tractor and upon a fixed bracket secured to said rear axle housing.

Secured to and adapted to rotate the shaft 64 is a driven pulley 70, around which is trained a belt 72, said belt passing around a drive pulley 74 secured to the power take-off shaft 10.

The front end of the shaft housing 50 projects beyond the channeled support plate 32 (Figure 2) and is fixedly connected to a gear housing 76. The gear housing is provided with a depending shaft housing 78, and it will be understood that the shaft 54 extends into the housing 76, and is connected by suitable gearing, not shown, to a saw blade shaft disposed within the housing 78. The saw blade shaft is secured, at its lower end, to a rotary saw blade 80.

By reason of the construction which has so far been illustrated and described, it may be noted that in any position to which the main frame 14 is swung upwardly or downwardly relative to the tractor T, the saw blade 80 will be rotated from the power take-off of the tractor. By reason of the swingable adjustment of the main frame 14, the saw blade can, as will be obvious, be positioned at selected elevations, for cutting brush or trees. Further, it will be readily apparent that the user need only drive the tractor T up to the tree to be cut, after which the tractor is halted and is allowed to remain stationary. Thereafter, the hand wheel 44 is operated, while the blade 80 is being driven from the power take-off, for the purpose of advancing the blade into the tree.

The means which I have provided for effecting swingable adjustment of the main frame 14, and hence the saw blade 80, to selected elevations is best shown in Figure 2, and includes a cable 82 connected at one end to the front end rail 18 of the main frame. Intermediate its ends, the cable 82 is trained over a sheave 84, said sheave being rotatably mounted upon a bracket 86 attached rigidly to the tractor frame. The cable 82 is then extended longitudinally of the tractor, and is connected at its other end to the lower end of an arcuate, depending extension 88, that extends downwardly from the outer end of a vertically swingable lift arm 90 secured to the power lift shaft 12 of the tractor.

By reason of this formation and relative arrangement of parts, the operator of the tractor is enabled to effect the swingable adjustments of the main frame without leaving the driver's seat of the tractor, it being apparent that he can also bring about the advancing movement of the saw blade 80 without leaving said seat.

Means is also provided, in the structure, for controlling the falling movement of the tree, and to this end, I provide a pressure arm support frame designated generally by the reference numeral 92, and including forwardly converging longitudinal members 94, said members being integral with angular front end portions 96. The front end portions 96 converge toward the front end of the frame 92, and at their convergent ends, are rigidly secured to a sleeve 98.

Intermediate the opposite ends of the frame 92, I provide cross brace members 100, said members extending transversely of the frame 92 and being rigidly secured, at their inner ends, to a sleeve 102 aligned coaxially with the sleeve 98.

A pressure bar 104 is slidably mounted in the sleeves 98, 102, and is disposed longitudinally and centrally of the frame 92. Intermediate the opposite ends of the pressure bar, a collar 106 is formed thereon, a spring 108 being circumposed about the pressure arm and abutting at its opposite ends against said collar and the sleeve 102 respectively. Thus, the spring 108 tends to urge the pressure bar 104 forwardly against a tree being cut, the pressure bar having, at its front end, a header 110 adapted to engage the tree at a location spaced a substantial distance above that at which the tree is being cut (see Figure 2).

It will be appreciated that when the tractor is moved to its proper position, the header 110 will be engaged by the trunk of the tree, as a result of which the pressure bar 104 will be urged rearwardly against the action of the spring 108. The tree is then cut, in the manner discussed above, and when the cut is completed, the spring 108 will be free to expand, since the tree trunk will no longer resist said expansion. As a result, the header 110 and the pressure bar 104 will be urged forwardly, and will force the tree over, in a direction away from the tractor.

It is believed to be an important characteristic of the invention that it can be constructed as a tractor attachment, without necessity of modification or redesign of the tractor itself. In other words, the structure, as distinguished from other structures used for the same purpose, can be manufactured at a relatively low cost, and does not prevent ordinary use of the tractor. At such time as it is desired to cut brush or saw trees, the attachment is mounted in the manner illustrated in the drawings, and at the completion of the brush cutting or tree felling operation, the attachment can be readily removed.

It is also believed to be an important characteristic of the invention that the structure which I have designed is so formed as to permit the use of three of the units simultaneously, one being attached to each side of the tractor, and one being mounted at the back of the tractor, thus to make possible the use of the tractor-mounted attachment as a mower for cutting hay and the like. In this way, it would be possible, I believe, to permit the mowing of a strip of about twenty feet in breadth, as distinguished from the largest tractor-mounted mower now in use which, to the best of my knowledge, cuts a strip approximately seven feet in breadth.

It is believed apparent that the invention is not necessarily confined to the specific use or uses thereof described above, since it may be utilized for any purpose to which it may be suited. Nor is the invention to be necessarily limited to the specific construction illustrated and described, since the construction is only intended to be illustrative of the principles of operation and the means presently devised to carry out said principles, it being considered that the invention comprehends any minor change in construction that may be permitted within the scope of the appended claims.

What is claimed is:

1. A saw attachment for tractors comprising: a main frame; a channeled support plate of rectangular cross section rigid therewith and having bearing means spaced along its length; an advancing screw journaled in said bearing means and having a follower threadedly engaged therewith; an operating rod having a universal connection to said screw and extending to a location remote from the main frame for rotation by an operator to advance said follower; a channeled housing formed to a cross sectional shape complementing that of the support plate and sliding in said support plate; a shaft housing rigidly secured in the channeled housing and affixed to said follower to be advanced therewith; a shaft journaled in said shaft housing for advancement therewith and with the channeled housing within the support plate; and a blade assembly carried by said shaft housing beyond one end of the main frame and having a driving connection with said shaft.

2. A saw attachment for tractors comprising: a main frame; an elongated, channeled support plate of rectangular cross section rigid with and extending longitudinally of the main frame, said support plate being open at its top and having a plurality of cross pieces spaced along its length and bridging said open top, said cross pieces having bearings aligned with one another longitudinally of the support plate; an advancing screw journaled in said bearings and having a follower threadedly engaged therewith; an operating rod having a universal connection to said screw and extending to a location remote from the main frame for rotation by an operator to advance said follower; a channeled housing formed to a cross sectional shape complementing that of the support plate and sliding in said support plate; a shaft housing rigidly secured in the channeled housing and affixed to said follower to be advanced therewith; a shaft journaled in said shaft housing for advancement therewith and with the channeled housing within the support plate; and a blade assembly carried by said shaft housing beyond one end of the main frame and having a driving connection with said shaft.

T. V. JONES.

References Cited in the file of this patent

UNITED STATES PATENTS

| Number | Name | Date |
|---|---|---|
| 638,553 | Burke | Dec. 5, 1899 |
| 1,414,319 | Zaiauskis | Apr. 25, 1922 |
| 1,602,357 | Georgelis | Oct. 5, 1926 |
| 2,404,655 | Randall | July 23, 1946 |
| 2,436,504 | Duncklee | Feb. 24, 1948 |
| 2,439,607 | Irwin | Apr. 13, 1948 |
| 2,461,589 | Crawford | Feb. 15, 1949 |
| 2,462,314 | Fuqua | Feb. 22, 1949 |
| 2,575,696 | Way | Nov. 20, 1951 |
| 2,619,129 | Hines | Nov. 25, 1952 |